J. R. DONNELLY.
OIL CONDUCTOR.
APPLICATION FILED JAN. 25, 1906.

950,225.

Patented Feb. 22, 1910.

John Richard Donnelly. Inventor by Ellis Spear Jr.

Attorney

Witnesses
Wm. B. Poor,
Walter L. Caue.

UNITED STATES PATENT OFFICE.

JOHN RICHARD DONNELLY, OF PORTLAND, MAINE, ASSIGNOR TO GENERAL HYDROCARBON CO., OF PORTLAND, MAINE, A CORPORATION OF MAINE.

OIL-CONDUCTOR.

950,225.

Specification of Letters Patent. Patented Feb. 22, 1910.

Application filed January 25, 1906. Serial No. 297,724.

*To all whom it may concern:*

Be it known that I, JOHN RICHARD DONNELLY, a citizen of the United States, residing at Portland, in the county of Cumberland and State of Maine, have invented certain new and useful Improvements in Oil-Conductors, of which the following is a specification.

This invention relates to oil conductors and particularly to a flexible oil conductor adapted to be used in connection with oil consuming apparatus such as torches, lamps and other devices using hydrocarbon or any similar liquid fuel. It has been found necessary in these conductors to use only metal in contact with the oil and it is the object of the present invention to provide a conductor which will have only metal surfaces contacting with the oil, which will be flexible and at the same time protected against undue twist or compression which might rupture or dent the thin metal of the inner tubes. To this end I have provided a combination of small flexible metal tubes so arranged and connected as to deliver a substantial volume of oil and an envelop for protecting these small tubes, which envelop shall be itself flexible and yet of sufficient strength to withstand any twists or lateral compressions to which it might be subjected in use.

The details of this construction will be more fully described in the specification which follows in which like characters of reference indicate corresponding parts throughout.

Figure 1:
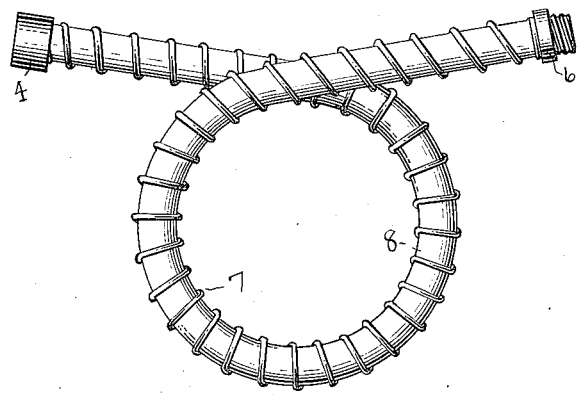
Figure 2:
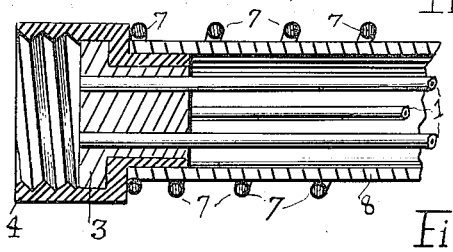
Figure 3:
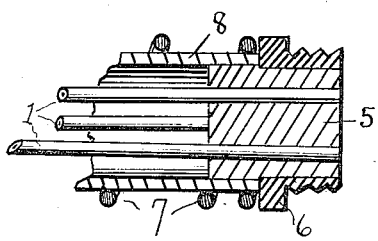
Figure 3:
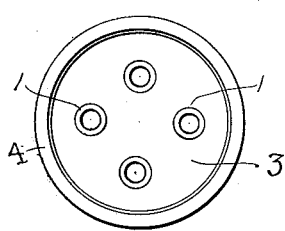
Figure 4:
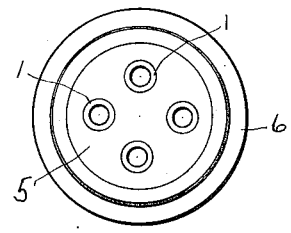

In the drawings which form a part of said specification, like characters are used to indicate corresponding parts throughout and in these drawings; Figure 1, is a general view of my oil conductor, Fig. 2, is a section of the two ends thereof, and Figs. 3 and 4, end views of the two couplings.

1, is a plurality of small brass tubes of sufficiently light stock to allow them to be readily bent.

3 is a block having perforations therethrough into which the ends of the tubes 1 are soldered. The block 3 is located in an internally threaded coupling member 4. At the other end the tubes 1 enter a similar block 5 in which they are fastened in a similar manner. This block 5 is mounted in an externally threaded coupling member 6 adapted to make connection with an internally threaded coupling such as 4. The blocks 3 and 5 are so arranged in the couplings as to make a tight joint and the couplings are arranged to be tightly united so that the oil which passes through the tube 1 will pass also through the coupling. Outside of the tubes 1 and properly attached to the couplings 4 and 5 is an envelop 8 which may be of any suitable material. I find that such an envelop made of canvas and rubber gives complete satisfaction and protects the outside of the tubes against many forms of injury.

7 is a spirally wound strip which may be of any suitable metal, but is preferably made of steel or some such stock. This strip 7 is attached to the couplings 4 and 5 and is either embedded in the envelop 8 or wound against either surface.

In use the conductor is attached through its couplings with the tank at one end, from which the oil is to be taken and with the torch or other device at its other end to which the oil is to be conducted. The couplings having been properly adjusted the oil will pass freely through the plurality of small pipes to supply a proper amount of oil. If it is desired to bend or coil the conductor the small pipes will readily yield and assume the proper position within the envelop. At the same time the spirally wound strip 7 will yield to conform to the bend of the conductor and will at the same time prevent the tubes from being unduly twisted, crushed or kinked.

The number of tubes may be varied to suit the amount of oil required to be conducted, the nature of the couplings may be modified to suit conditions and other changes may be made without departing from the spirit of my invention.

What I therefore claim and desire to secure by Letters Patent, is:—

1. A flexible oil conductor comprising a plurality of substantially straight flexible solid wall tubes and a non-compressible, non-kinking envelop having a complete normal separation from said tubes and permitting them to have free play therein.

2. A flexible oil conductor comprising a plurality of substantially straight flexible solid wall tubes and a spirally wound envelop having a complete normal separation from said tubes and permitting them to have free play therein.

3. A flexible oil conductor comprising a substantially straight solid wall flexible conducting tube and a non-compressible, non-kinking envelop having a complete normal separation from said tube and permitting it to have free play therein.

4. A flexible oil conductor comprising a substantially straight solid wall flexible conducting tube and a spirally wound envelop having a complete normal separation from said tube and permitting it to have free play therein.

In testimony whereof, I affix my signature in presence of two witnesses.

JOHN RICHARD DONNELLY.

Witnesses:
 HOWARD R. IVES,
 CHARLES F. LIBBY.